United States Patent [19]

Keuper et al.

[11] Patent Number: 5,375,892
[45] Date of Patent: Dec. 27, 1994

[54] QUICK COUPLING FOR LINES IN AUTOMOBILES

[75] Inventors: Dieter Keuper, Kolefeld; Horst Haberjan, Walsrode, both of Germany

[73] Assignee: Continental Aktiengesellschaft, Hannover, Germany

[21] Appl. No.: 93,045

[22] Filed: Jul. 15, 1993

[30] Foreign Application Priority Data

Jul. 15, 1992 [Germany] .................. P4223251

[51] Int. Cl.[5] .................. F16L 35/00; F16L 39/00
[52] U.S. Cl. .................. 285/319; 285/93; 285/921
[58] Field of Search .............. 285/921, 93, 317, 137.1

[56] References Cited

U.S. PATENT DOCUMENTS

| | | | |
|---|---|---|---|
| 4,844,512 | 7/1989 | Gahwiler | 285/921 |
| 4,900,065 | 2/1990 | Houck | 285/137.1 |
| 4,941,689 | 7/1990 | Sjöberg | 285/921 |
| 5,002,315 | 3/1991 | Bartholomew | 285/93 |
| 5,022,461 | 6/1991 | Potter et al. | 285/137.1 |
| 5,064,227 | 11/1991 | Spors et al. | 285/921 |
| 5,069,489 | 12/1992 | Bartholomew | 285/921 |
| 5,078,429 | 1/1992 | Braut et al. | 285/319 |
| 5,123,677 | 6/1992 | Kreczko et al. | 285/921 |
| 5,152,555 | 10/1992 | Szabo | 285/93 |
| 5,193,857 | 3/1993 | Kitamura | 285/921 |
| 5,228,724 | 7/1993 | Godeau | 285/921 |

FOREIGN PATENT DOCUMENTS

| | | | |
|---|---|---|---|
| 396455 | 11/1990 | European Pat. Off. | 285/319 |
| 0444304 | 9/1991 | European Pat. Off. | |
| 2648384 | 6/1977 | Germany | 285/319 |
| 8811459 | 2/1989 | Germany | |
| 3825866 | 2/1990 | Germany | 285/319 |
| 4-8991 | 1/1992 | Japan | 285/319 |

*Primary Examiner*—Eric K. Nicholson
*Attorney, Agent, or Firm*—Robert W. Becker & Associates

[57] ABSTRACT

A quick coupling for detachably connecting a hose nipple to a pipe socket of automotive hoses has a pipe socket and a hose nipple with a first and a second end. A hose is fixedly and sealing connected to one end of the pipe socket and the hose nipple. A sealing ring is connected to the outer wall surface of the free end of the hose nipple. The hose nipple is inserted with its free end into the pipe socket and fixedly and detachably connected to the pipe socket such that the sealing ring radially seals the space between the inner wall surface of the pipe socket and the outer wall surface of the hose nipple by being radially compressed. The free end of the pipe socket has a plurality of openings and the hose nipple has a plurality of tongue-shaped springs for engaging the openings extending axially from the sealing ring toward the connected hose. Each spring has a conical, radially outwardly extending portion. The springs are forced radially inwardly upon insertion of the hose nipple into the pipe socket by the forward edge of the pipe socket and, upon reaching a sealing end position, the springs snap radially outwardly into the openings of the pipe socket.

18 Claims, 2 Drawing Sheets

5,375,892

QUICK COUPLING FOR LINES IN AUTOMOBILES

BACKGROUND OF THE INVENTION

The present invention relates to a quick coupling for lines in automobiles for detachably connecting a hose nipple to a pipe socket. The quick coupling comprises a pipe socket with an inner wall surface and a free end with a forward edge portion, a hose nipple with a first and a second end and an outer wall surface, having a hose fixedly and sealingly connected to the first end of the hose nipple, and a sealing ring connected to the outer wall surface at the second end of the hose nipple. The hose nipple with the second end is inserted into the pipe socket and fixedly and detachably connected to the pipe socket such that the sealing ring radially fills and seals an annular space between the inner wall surface of the pipe socket and the outer wall surface of the hose nipple by being radially compressed.

Such a quick coupling is for example known from European Patent Application 0 444 304. In this known quick coupling a hose nipple to which a hose is fastened is fluid-tightly coupled to a pipe socket and fixed with a simple latching element. This quick coupling is of a simple design and thus provides for a simple manufacture as well as simple, manual mounting. However, since the latching element must be guided perpendicularly to the axial direction of the quick coupling to be inserted a relatively large space is required for mounting the coupling.

It is therefore an object of the present invention to provide a quick coupling of the aforementioned kind with a very compact construction.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
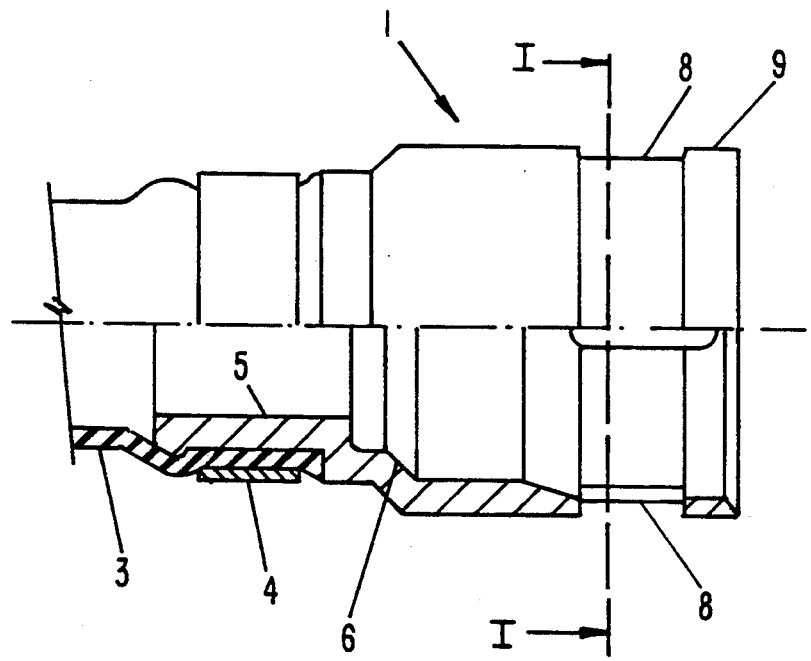
FIG. 1 shows a pipe socket in elevational and part-sectional view.

The quick coupling for lines in automobiles for detachably connecting a hose nipple to a pipe socket according the present invention is primarily characterized by:

A pipe socket with an inner wall surface, the pipe socket having a free end with a forward edge portion;

A hose nipple with a first and a second end and an outer wall surface, having a hose fixedly and sealingly connected to the first end;

A sealing ring connected to the outer wall surface at the second end of the hose nipple;

The hose nipple with the second end inserted into the pipe socket and fixedly and detachably connected to the pipe socket such that the sealing ring radially fills and seals an annular space between the inner wall surface of the pipe socket and the outer wall surface of the hose nipple by being radially compressed;

The free end of the pipe socket having a wall with a plurality of openings;

The hose nipple having a plurality of tongue-shaped springs extending axially from an area, adjacent to the sealing ring and facing away from an end face of the second end, toward the first end, each spring having a conical portion extending radially outwardly, with each spring engaging one of the openings;

The springs being force radially inwardly upon insertion of the hose nipple into the pipe socket by the forward edge portion and, upon reaching a sealing end position, the springs snapping radially outwardly into the openings of the pipe socket.

Preferably, two of the openings and two of the springs are provided, with the openings being arranged opposite one another and the springs being arranged opposite one another.

Expediently, each spring has a free radially extending end face that, under a pressure load on the quick coupling, abuts at an edge of the opening adjacent to the forward edge portion.

Advantageously, the width of each opening is substantially one third of the diameter of the pipe socket and each spring is substantially as wide as the openings.

In another embodiment of the present invention, the second end of the hose nipple has a conical portion and the pipe socket has a center portion adjacent to its free end. The center portion has a conical inner section.

Preferably, the quick coupling further comprises a safety means for ensuring correct positioning of the hose nipple in the pipe socket and preventing rotation of the hose nipple relative to the pipe socket after insertion, the safety means being comprised of at least two guides connected to the hose nipple and at least one projection connected to the pipe socket, the projection guided between the two guides upon insertion of the hose nipple into the pipe socket. Preferably, two of the safety means are provided on opposite sides of the quick coupling. Advantageously, two guides extend from the area, that is adjacent to the sealing ring and faces away from the end face of the second end, toward the first end, wherein the two guides each have a first portion and a second portion, said first portion adjacent to said area and the second portion connected to the first portion and extending toward the first end. The first portion converge from said area toward one another and the second portions extend parallel to one another. The first portions may be conically shaped or curved.

Preferably, the guides have a radial extension such that the guides rest at the inner wall surface of the pipe socket to thereby prevent canting.

In a preferred embodiment of the present invention, the springs are colored differently than the surrounding portion of the pipe socket.

Each spring has a free radially extending end face having at a radial inner end thereof a safety ridge extending axially toward the first end of the hose nipple.

Preferably, the forward edge portion of the pipe socket has an inwardly slanted inner edge.

Expediently, the springs have a radially inwardly oriented side that beginning at the area adjacent to the sealing ring has sequentially: an axially extending portion, the aforementioned conical portion, and a further axially extending portion.

Preferably, the conical portion of the spring extends at an angle of substantially 30° relative to an axial direction of the quick coupling.

The springs preferably have free radially extending end faces.

Advantageously, the springs have free ends with projections that upon insertion into the pipe socket protrude past the outer contour of the pipe socket.

The present invention has the advantage of providing a simple handling of the quick coupling during mounting as well as providing a high functional reliability. With a simple variation at the springs of the hose nipple it is possible to change the quick coupling such that it can only be mounted and demounted with a special tool or such that mounting and demounting can be performed by hand. For reaching the required operational end position, an increased safety is provided because the springs snap into the window-like openings with a clearly audible snapping noise. An increased operational safety also results from the two coupling parts being only subjected to pressure. Since the springs have approximately the width of the window-like openings, it is furthermore ensured that a first rotational safety means in the circumferential direction is provided. An incomplete insertion of the hose nipple into the pipe socket results in an elastic return of the parts due to the conical extension of the springs so that essentially the open, unconnected state is again reached which results in a clearly visible indication that the quick coupling has not been mounted properly. When the pipe socket is differently colored than the springs, a further visual control of the correct seating of the hose nipple within the pipe socket is ensured.

In a preferred embodiment of the quick coupling two oppositely arranged springs and two oppositely arranged window-like openings are provided. However, according to the present invention it is, of course, also possible to provide three or four springs, respectively, coordinated window-like openings.

With the inventive quick coupling the secure connection in the operational position is ensured by the flanks (free radially extending end faces) of the spring being supported at the respective forwardly positioned edges of the openings. The width of the window-like openings corresponds to approximately one third of the diameter of the pipe socket, while the springs of the hose nipple correspond approximately to the width of the openings of the pipe socket. In a preferred embodiment the forward (in the direction of insertion) outer portion of the hose nipple and the rearward (in the direction of coupling) inner portion of the pipe socket are conically shaped. The quick coupling is provided with a safety means for ensuring correct positioning of the hose nipple within the pipe socket and also preventing rotation of the hose relative to the pipe socket in the mounted state (second rotational safety means). For this purpose, the hose nipple is provided with two guides, preferably with two guides each on two opposite sides of the hose nipple between which, during insertion of the hose nipple into the pipe socket, one projection is received. The first portions of the guides at the hose nipple converge from the forward end (in the direction of insertion) of the hose nipple in a conical fashion or in a curved fashion toward the rear so that for a slight relative rotation of the hose nipple and the pipe socket during insertion a relative rotational movement between the pipe socket and the hose nipple is generated such that during further insertion it is ensured that the springs will be positioned at the window-like openings and guided into these openings. The guides at the hose nipple furthermore serve as a canting prevention means in the longitudinal direction of the quick coupling. This is achieved by providing the guides with such an extension in the radial direction that they are supported at the inner wall surface of the pipe socket and thereby prevent a canting between the pipe socket and the hose nipple. The springs of the hose nipple have at their free radially extending end faces at a radially inner end thereof a safety ridge extending axially toward the first end (rearward end) of the hose nipple. This safety ridge prevents the spring from passing radially outwardly through the openings. With the inwardly slanted inner edge of the forward edge portion of the pipe socket the insertion of the springs of the hose nipple into the pipe socket is facilitated.

With a slight modification the springs can be embodied such that the quick coupling can only be mounted and demounted with a special tool or such that a mounting and demounting by hand is also possible. In a preferred embodiment the springs at their radially inner side starting in the vicinity of the sealing ring first have an axially extending portion, then a conical portion, and a further axially extending portion. The conically extending central portion of the spring should have an angle of approximately 30° relative to the axial extension of the quick coupling. In order to provide for a good support at the edges of the openings the springs should be provided with radially extending end faces. For facilitating mounting and demounting by hand, the free ends of the springs have projections that upon insertion into the pipe socket protrude past the outer contour of the pipe socket.

DESCRIPTION OF THE PREFERRED EMBODIMENTS

The present invention will now be described in detail with the aid of several specific embodiments utilizing FIGS. 1 through 7.

Figure 2:
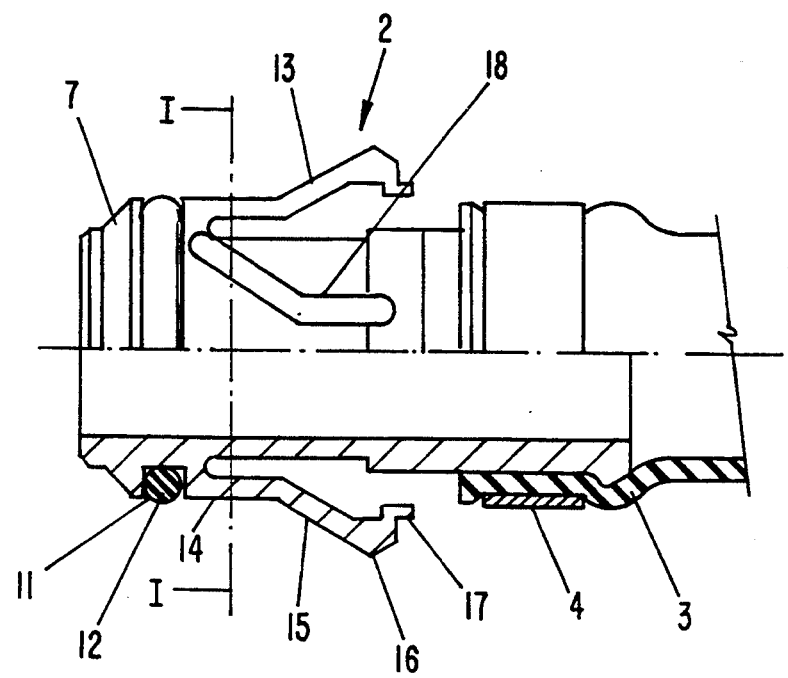
FIG. 2 shows a hose nipple in elevational and part-sectional view.
Figure 3:
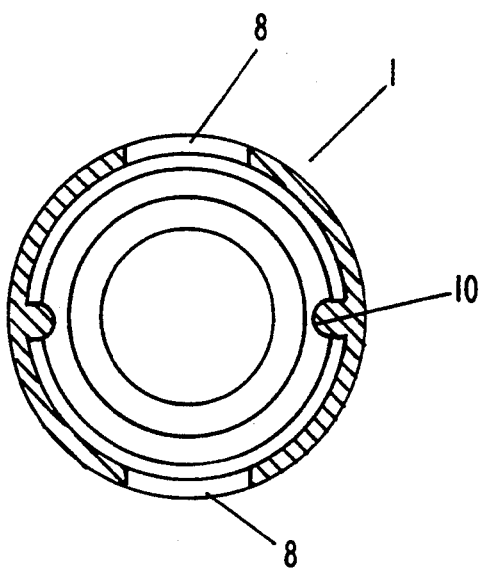
FIG. 3 shows a cross-section of the pipe socket in the plane A—A of FIG. 1.
Figure 4:
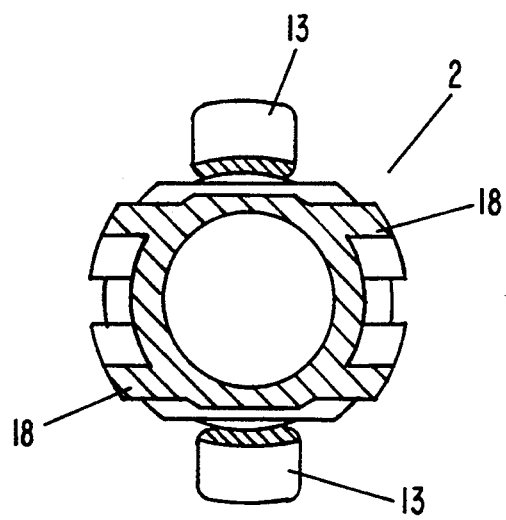
FIG. 4 shows a cross-section of the hose nipple in the plane A—A of FIG. 2.

FIGS. 1 and 3 show the pipe socket 1, and FIGS. 2 and 4 show the hose nipple 2 of the quick coupling of the present invention. To the pipe socket 1 and to the hose nipple 2 hoses 3 are connected in a manner known per se, for example, with clamp rings 4. The pipe socket 1 or the hose nipple 2 can also be directly integrated into other parts, for example, into pipe branches. The pipe socket 1, beginning at the fastening flange 5 for the hose 3, widens in the forward direction (coupling direction) so that it can receive in its interior the hose nipple 2. In the transition zone between the fastening flange 5 and the forwardly arranged sleeve-type widened portion a conical area 6 is provided for receiving a conical portion 7 of the hose nipple 2.

In the forward area of the pipe socket 1 two substantially square window-like openings 8 are provided which are arranged opposite one another. The window-like openings 8 have a width which correspond approximately to one third of the diameter of the pipe socket and are delimited in the forward direction by the edge portion 9 of the pipe socket 1. The inner wall of the pipe socket 1 is provided with oppositely arranged projections 10 extending in the longitudinal direction which are displaced by 90° relative to the openings 8. The forward edge portion 9 of the pipe socket 1 has an inner edge that is inwardly slanted (in the direction of insertion). The hose nipple 2 at its forward end is provided with a groove 11 into which a sealing ring 12, for example, an O-ring, is inserted and secured against removal. When mounting the quick coupling, this sealing ring 12 is positioned under radial compression between the outer wall surface of the hose nipple 2 and the inner wall surface of the pipe socket 3 so that a secure sealing with respect to fluids flowing through the coupling is ensured.

Behind the groove 11 two oppositely arranged tongue-shaped springs 13 extend from the wall of the hose nipple 2. A first portion 14 extends axially, followed by a conically extending portion 15 and then a further axially extending portion 16. The conical portion 15 of the springs 13 is dimensioned such that during insertion of the hose nipple 2 into the pipe socket 1 the springs 13 are forced radially inwardly by the forward edge portion 9. The springs 13 at their free end have radially extending end faces which at their radially inwardly oriented end have a safety ridge 17 extending in the axial direction away from the end faces toward the hose 3.

At the same axial position as the springs 13, on each side of the hose nipple 2 two guides 18 are provided which are rotated in the circumferential direction relative to the springs 13. The rearward portions of the guides 18 extend parallel to one another, while the forward portions in the direction of insertion diverge conically. Within the forward portion the guides 18 may also be embodied in a curved diverging manner. The rearward parallel portions are spaced from one another such that the projections 10 of the pipe sockets can be received therebetween. In conjunction with the projections 10 of the pipe sockets the guides 18 provide a safety means for ensuring correct positioning of the hose nipple as well as prevention of rotation in the inserted state. The guides 18 also have another function. They have a radial extension selected such that they rest at the inner wall surface of the pipe socket 1 so that they provide a means against canting in the longitudinal direction. The pipe socket 1 and the hose nipple 2 are preferably made of conventional plastic materials and should be colored differently, i.e., at least the springs 13 of the hose nipple 2 should be of a different color than the housing of the pipe socket 1.

In the following the mounting of the quick coupling will be explained in detail. The hose nipple 2 is inserted in the axial direction into the pipe socket 1. During insertion the springs 13, with respect to the circumferential direction, should be positioned at the location of the window-like openings 8. Should this not be the case, the guides 18 and the projections 10 will ensure that upon further insertion of the hose nipple 2 into the pipe socket 1 a relative movement between the nipple 2 and the pipe socket 1 in the circumferential direction occurs until the springs 13 are at the desired location for engagement of the window-like openings 8. During the insertion of the hose nipple 2 the conical portions 15 of the springs 13 abut at the slanted forward edge portion 9 of the pipe socket 1 and are radially inwardly displaced. As soon as the springs 13 with their radially extending end faces have reached the forward edges of the window-like openings 8 they snap into position and generate a loud noise when entering the window-like openings 8. This completes the latching of the two parts of the quick coupling. The safety ridges 17 prevent the springs 13 from snapping radially outwardly past the window-like openings 8.

Figure 5:
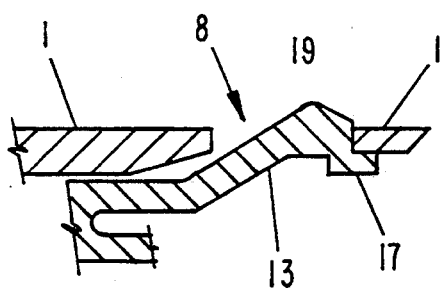
FIGS. 5–7 show variations of a spring located in the opening of the pipe socket in a schematic representation.
Figure 6:
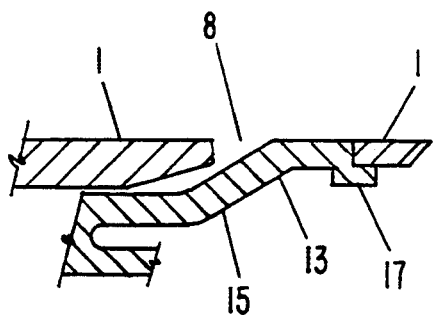
Figure 7:
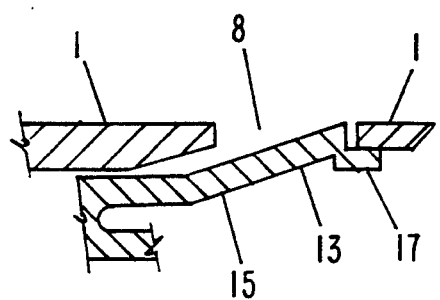

FIGS. 5 to 7 show variations of the springs 13 as well as their position within the window-like openings 8 of the pipe socket 1. The quick coupling represented in FIG. 5 is suitable for mounting and demounting by hand, while the quick couplings represented in FIGS. 6 and 7 require special tools. In the embodiment of FIG. 5 the spring 13 at its rearward free end is provided with a projection 19 which, in the mounted state of the quick coupling, projects past the outer contour of the pipe socket 1. For demounting the quick coupling it is possible to manually press the projection 19 into the window-like opening 8 to such an extent that the end faces of the spring 13 are displaced into a position radially inwardly of the edge of the opening 8 of the pipe socket 1 so that a movement of the hose nipple 2 away from the pipe socket 1 is possible, thereby releasing the quick coupling. In the embodiment of FIG. 6 the rearward free end of the spring 13 with the safety ridge 17 is radially outwardly flush with the wall of the pipe socket 1 so that it is impossible to achieve a manual demounting by pressing the spring far enough radially inwardly. FIG. 7 shows a further variation of the spring 13 in which the conical central portion 15 is substantially extended to the end face and the safety ridge 17. In this case, as in the embodiment of FIG. 6, a special tool is required for demounting the quick coupling.

The present invention is, of course, in no way restricted to the specific disclosure of the specification and drawings, but also encompasses any modifications within the scope of the appended claims.

What we claim is:

1. A quick coupling for lines in automobiles for detachably connecting a hose nipple to a pipe socket; said quick coupling comprising:

a pipe socket with an inner wall surface, said pipe socket having a free end with a forward edge portion;

a hose nipple with a first and a second end and an outer wall surface, having a hose fixedly and sealingly connected to said first end;

a sealing ring connected to said outer wall surface at said second end of said hose nipple;

said hose nipple with said second end inserted into said pipe socket and fixedly and detachably connected to said pipe socket such that said sealing ring radially fills and seals an annular space between said inner wall surface of said pipe socket and said outer wall surface of said hose nipple by being radially compressed;

said free end of said pipe socket having a wall with a plurality of windows;

said hose nipple having a plurality of tongue-shaped springs extending axially from an area, adjacent to said sealing ring and facing away from an end face of said second end, toward said first end, each said spring having a conical portion extending radially outwardly, with each said spring engaging one said window;

said springs being forced radially inwardly upon insertion of said hose nipple into said pipe socket by said forward edge portion and, upon reaching a sealing end position, said springs snapping radially outwardly into said windows of said pipe socket; and a safety means for ensuring correct positioning of said hose nipple in said pipe socket and preventing rotation of said hose nipple relative to said pipe socket after insertion, said safety means being comprised of at least two guides connected to said hose nipple and at least one projection connected to said pipe socket, said projection guided between said two guides upon insertion of said hose nipple into said pipe socket.

2. A quick coupling according to claim 1, wherein two of said windows and two of said springs are provided, with said windows being arranged opposite one another and said springs being arranged opposite one another.

3. A quick coupling according to claim 1, wherein each said spring has a free radially extending end face that, under a pressure load on said quick coupling, abuts at an edge of said windows adjacent to said forward edge portion.

4. A quick coupling according to claim 1, wherein a width of each said window is substantially one third of a diameter of said pipe socket and wherein each said spring is substantially as wide as said window.

5. A quick coupling according to claim 1, wherein said second end of said hose nipple has a conical portion and said pipe socket having a center portion adjacent to said free end, said center portion having a conical inner section.

6. A quick coupling according to claim 1, wherein two said safety means are provided on opposite sides of said quick coupling.

7. A quick coupling according to claim 1, wherein said two guides extend from said area, adjacent to said sealing ring and facing away from an end face of said second end, toward said first end, with said two guides each having a first portion and a second portion, said first portion adjacent to said area and said second portion connected to said first portion and extending toward said first end, said first portions converging from said area toward one another and said second portions extending parallel to one another.

8. A quick coupling according to claim 7, wherein said first portions are conical.

9. A quick coupling according to claim 7, wherein said first portions are curved.

10. A quick coupling according to claim 1, wherein said guides have a radial extension such that said guides rest at said inner wall surface of said pipe socket to thereby prevent canting.

11. A quick coupling according to claim 1, wherein said springs are colored differently than a surrounding portion of said pipe socket.

12. A quick coupling according to claim 1, wherein each said spring has a free radially extending end face having at a radially inner end thereof a safety ridge extending axially toward said first end of said hose nipple.

13. A quick coupling according to claim 1, wherein said forward edge portion of said pipe socket has an inwardly slanted inner edge.

14. A quick coupling according to claim 1, wherein said springs have a radially inwardly oriented side that beginning at said area adjacent to said sealing ring has sequentially: an axially extending portion, said conical portion, and a further axially extending portion.

15. A quick coupling according to claim 1, wherein said conical portion of said spring extends at an angle of substantially 30° relative to an axial direction of said quick coupling.

16. A quick coupling according to claim 1, wherein said springs each have a free radially extending end face.

17. A quick coupling according to claim 1, wherein said springs have free ends with projections that upon insertion into said pipe socket protrude past an outer contour of said pipe socket.

18. A quick coupling according to claim 1, wherein said springs have a width that is substantially identical to a width of said windows.

* * * * *